(12) United States Patent
Shin

(10) Patent No.: US 6,467,580 B2
(45) Date of Patent: Oct. 22, 2002

(54) CONTINUOUS WATERWAY FOOD SERVING SYSTEM WITH STABILIZER MECHANISM FOR INDIVIDUAL FOOD CARRIERS

(76) Inventor: Eon Kook Shin, 5075 Lapa Dr. #1, San Jose, CA (US) 95129

(*) Notice: Subject to any disclaimer, the term of this patent is extended or adjusted under 35 U.S.C. 154(b) by 90 days.

(21) Appl. No.: 09/727,400

(22) Filed: Nov. 30, 2000

(65) Prior Publication Data

US 2002/0063020 A1 May 30, 2002

(51) Int. Cl.[7] .................................................. E04H 3/04
(52) U.S. Cl. ........................................................ 186/49
(58) Field of Search ............................. 186/49, 50, 38, 186/40, 42

(56) References Cited

U.S. PATENT DOCUMENTS

| | | | |
|---|---|---|---|
| 4,560,032 A | | 12/1985 | Imanaka ...................... 186/38 |
| 5,474,153 A | * | 12/1995 | Iwamoto et al. ............... 104/73 |
| 5,566,782 A | | 10/1996 | Iwamoto et al. ............... 186/49 |
| 5,813,497 A | * | 9/1998 | Iwamoto et al. ............. 114/253 |
| 5,823,296 A | * | 10/1998 | Iwamoto et al. ............... 104/73 |
| 6,179,088 B1 | * | 1/2001 | Lai ............................. 104/73 |

* cited by examiner

*Primary Examiner*—Donald P. Walsh
*Assistant Examiner*—Mark J. Beauchaine
(74) *Attorney, Agent, or Firm*—H. Joseph Jung (57) ABSTRACT

A stabilizing system for individual food carriers in an enclosed continuous waterway food serving system is described. The food serving system comprises a plurality of boat shaped food carriers floating in the continuous waterway propelled by a current induced into the waterway. Each food carrier comprises one or more stabilizer bars affixed to a bottom surface of the food carrier and extending from the side of the food carrier to stabilize the food carrier from a rolling motion in the water. The stabilizer bars are constructed of clear plastic to hide their presence when the food carrier is placed in the waterway. Each food carrier further comprises a horizontal bar affixed to the stern end of the food carrier and configured to contact the bow of a following food carrier when the food carriers are deployed in the continuous waterway.

14 Claims, 8 Drawing Sheets

CONTINUOUS WATERWAY FOOD SERVING SYSTEM WITH STABILIZER MECHANISM FOR INDIVIDUAL FOOD CARRIERS

FIELD OF THE INVENTION

The present invention relates generally to the commercial food services industry, and more specifically to a food serving and displaying system using a continuous water channel.

BACKGROUND OF THE INVENTION

Within recent years, continuous revolving food serving systems have become quite popular in Japanese restaurants that serve sushi. These types of restaurants have come to rival traditional sushi restaurants in which patrons are seated at a bar to be served individually by the sushi chef. In the continuous revolving type of sushi restaurant, customers are seated around a circular or oblong bar. The bar contains a conveyor belt or similar type of continuously moving system to transport food items in front of the customers. The customers can choose and take the items they want, without having to place an order with the chef or wait staff. Similarly, the chef can prepare a set number of items without needing to respond to individual customer orders. This type of system results in an efficient food delivery service that has become popular for economy-oriented restaurants.

Early continuous revolving sushi restaurants typically utilized enclosed conveyor belts that transported individual sushi orders on small trays around a circular or oblong bar. To enhance the appeal of such systems, "sushi boat" systems were developed that utilized a closed circular waterway. In these systems, sushi orders are placed on trays that are in turn placed on small boats that float along the waterway in front of customers seated around the bar. Typically a one-way current is used to propel the boats along the waterway. The boats are usually arranged so that a "train" of boats is formed with each boat closely following the boat in front. This allows for the continuous presentation of food and a regular flow of the boats so that customers can more easily pick food trays off of the moving boats.

Because of the unstable nature of floating boats on a waterway, care must be taken to ensure that the train of boats moves consistently and calmly around the waterway. It is relatively easy to upset the flow of the boats by stopping a boat in the waterway or disrupting the natural flow of current in the waterway. Several different systems have been developed for the arrangement of the boats in the waterways. For example, U.S. Pat. No. 4,450,032 to Imanaka discloses the in-line arrangement of sushi boats in waterway through the use of chains coupling the bow of one boat to the stern of the boat in front. In this manner, the connected boats circulate in concert around the waterway. Another example is disclosed in U.S. Pat. No. 5,566,782 to Iwamoto, et al., which discloses an uncoupled arrangement of sushi boats in which a bumper device extending from the bow of each boat is used maintain a minimum distance between the boats. Although these disclosed systems address the issue of maintaining a predetermined spacing between the boats in the waterway, they do not address the problem of providing adequate stability to individual boats as they float along the waterway. Moreover, these present systems pose the problem of entanglement of boats with one another as they are pushed down the waterway and collide with one another. A further disadvantage of such present systems is that they add extraneous structures to the boats that detract from the aesthetic features of the boats.

SUMMARY OF THE PRESENT INVENTION

A stabilizing system for individual food carriers in an enclosed continuous waterway food serving system is described. The food serving system comprises a plurality of boat shaped food carriers floating in the continuous waterway propelled by a current induced into the waterway. Each food carrier comprises one or more stabilizer bars affixed to a bottom surface of the food carrier and extending from the side of the food carrier to stabilize the food carrier from a rolling motion in the water. The stabilizer bars are constructed of clear plastic to hide their presence when the food carrier is placed in the waterway. Each food carrier further comprises a horizontal bar affixed to the stern end of the food carrier and configured to contact the bow of a following food carrier when the food carriers are deployed in the continuous waterway.

In an alternative embodiment of the present invention, each food carrier also comprises a first magnet attached to the bow of the food carrier and a second magnet attached to the stern of the food carrier. Repulsive magnetic forces between the bow magnet of a following food carrier and the stern magnet of the preceding food carrier maintain a minimum distance between the two food carriers.

Other features and advantages of the present invention will be apparent from the accompanying drawings and from detailed description that follows.

BRIEF DESCRIPTION OF THE DRAWINGS

The present invention is illustrated by way of example and not limitation in the figures of the accompanying drawings, in which like references indicate similar elements, and in which.

DESCRIPTION OF THE PREFERRED EMBODIMENTS

A continuous waterway food serving system is described. In the following description, for purposes of explanation, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of preferred embodiments is not intended to limit the scope of the claims appended hereto.

Figure 1:
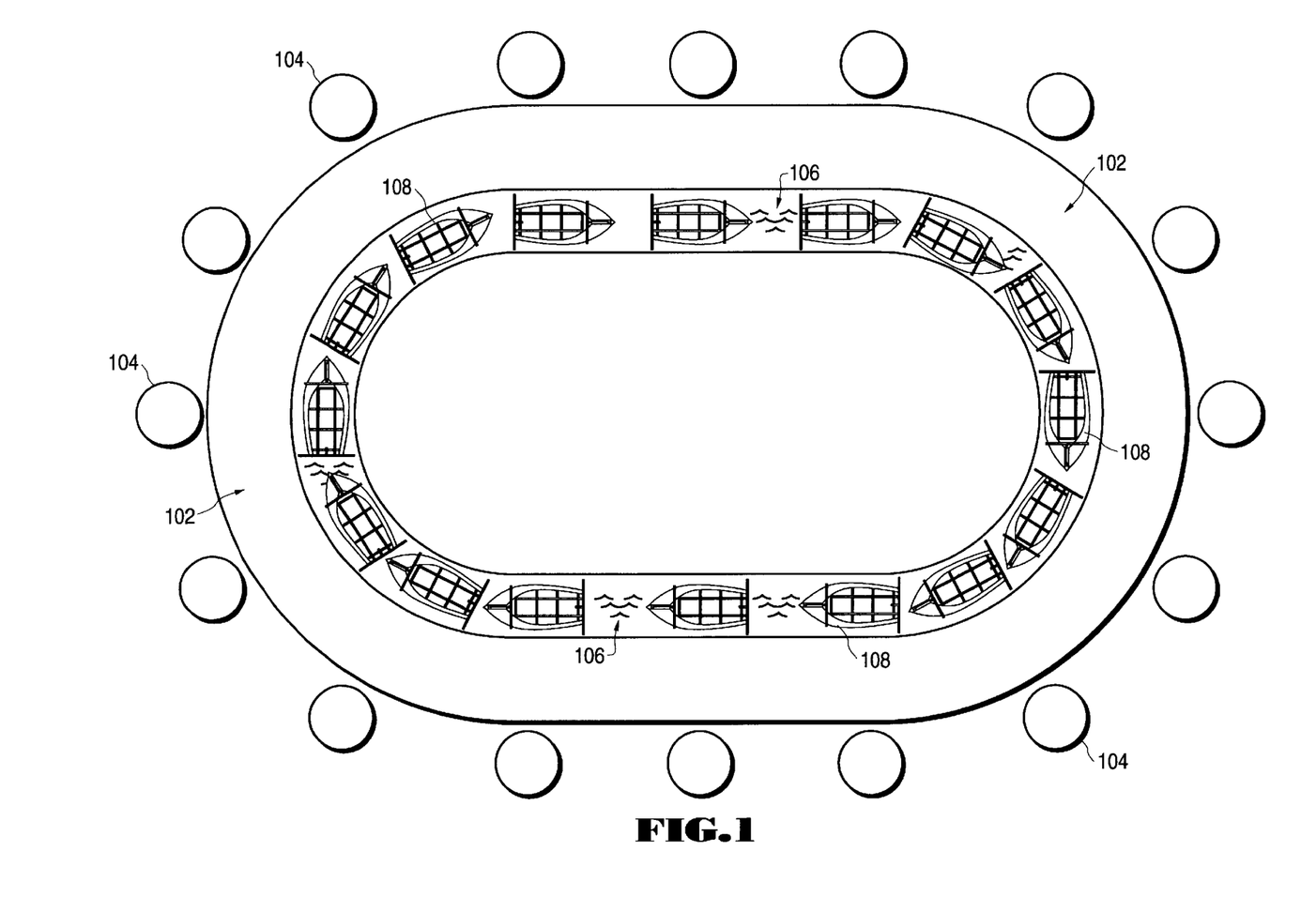
FIG. 1 illustrates an overhead view of a continuous waterway sushi bar in which embodiments of the present invention can be used.

FIG. 1 illustrates an overhead view of a continuous waterway sushi bar in which embodiments of the present invention can be used. The sushi bar consists of an enclosed circular or oblong bar area 102 around which are placed a number of seats 104 for the seating of customers. One or more sushi chefs stand in the center of the bar for preparation of the food items and replenishment of the trays on the sushi boats. A circular waterway 106 is disposed around the inside of the bar 102. A number of sushi boats 108 float along the waterway. A current induced in the waterway pushes the boats along the waterway in front of the customers. The sushi boats carry small trays of food that the customers can remove from the boat and place in front of them as the boats pass by.

Under certain conditions, the waterway can become quite turbulent. For example, a customer can tip a boat while attempting to take a tray off of the boat, or a customer can stop or otherwise impede a boat. Such a disturbance can cause other boats in the vicinity to become unsettled, and in extreme cases can even cause food to fall in the waterway or cause water to be splashed onto the bar. In one embodiment of the present invention, each sushi boat 108 within the continuous waterway food serving system 100 is affixed with a stabilizing system that maintains the stability of the boat in turbulent conditions.

Figure 2A:
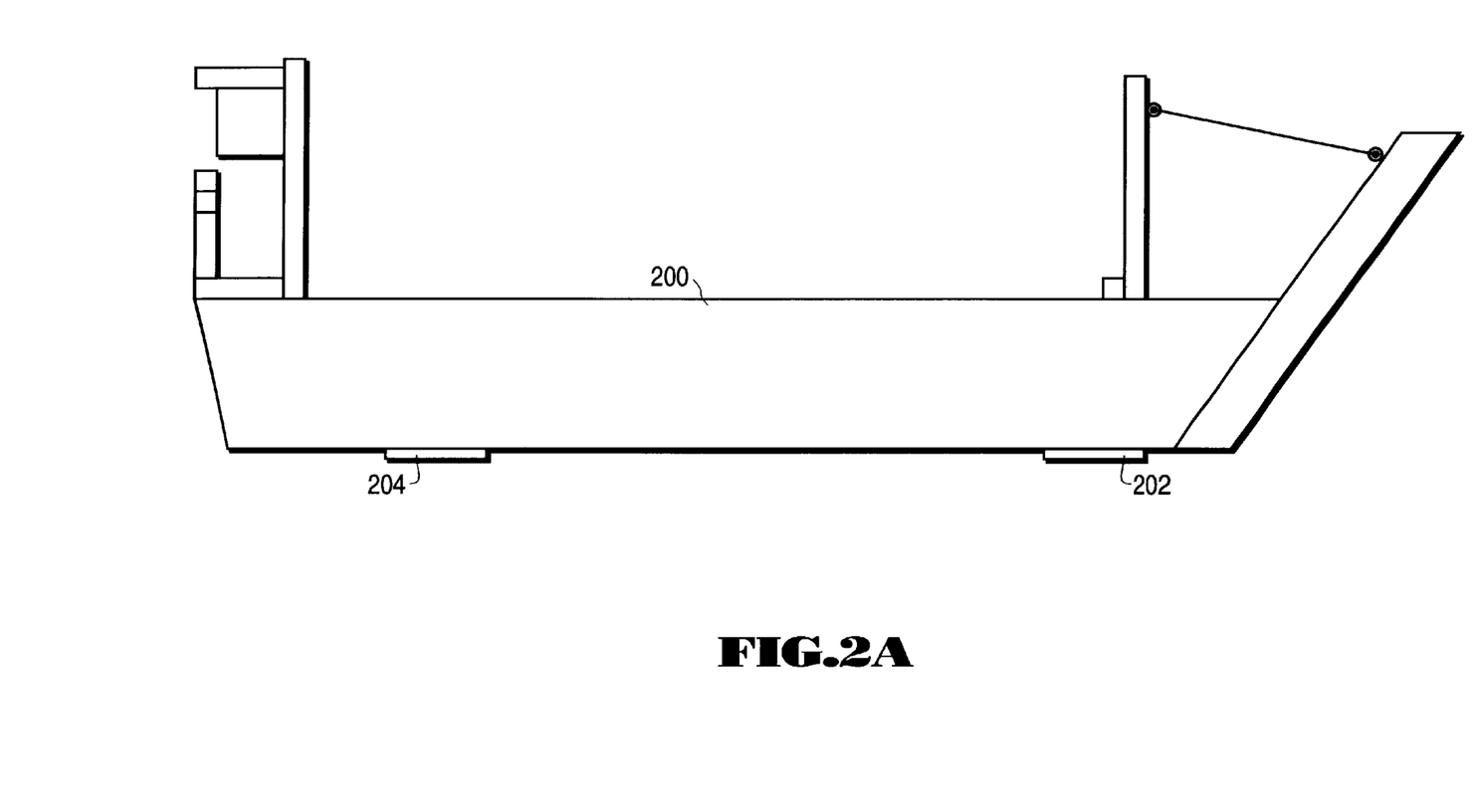
FIG. 2A illustrates a side-view of a sushi boat with a horizontal stabilizing system, according to one embodiment of the present invention.
Figure 3:
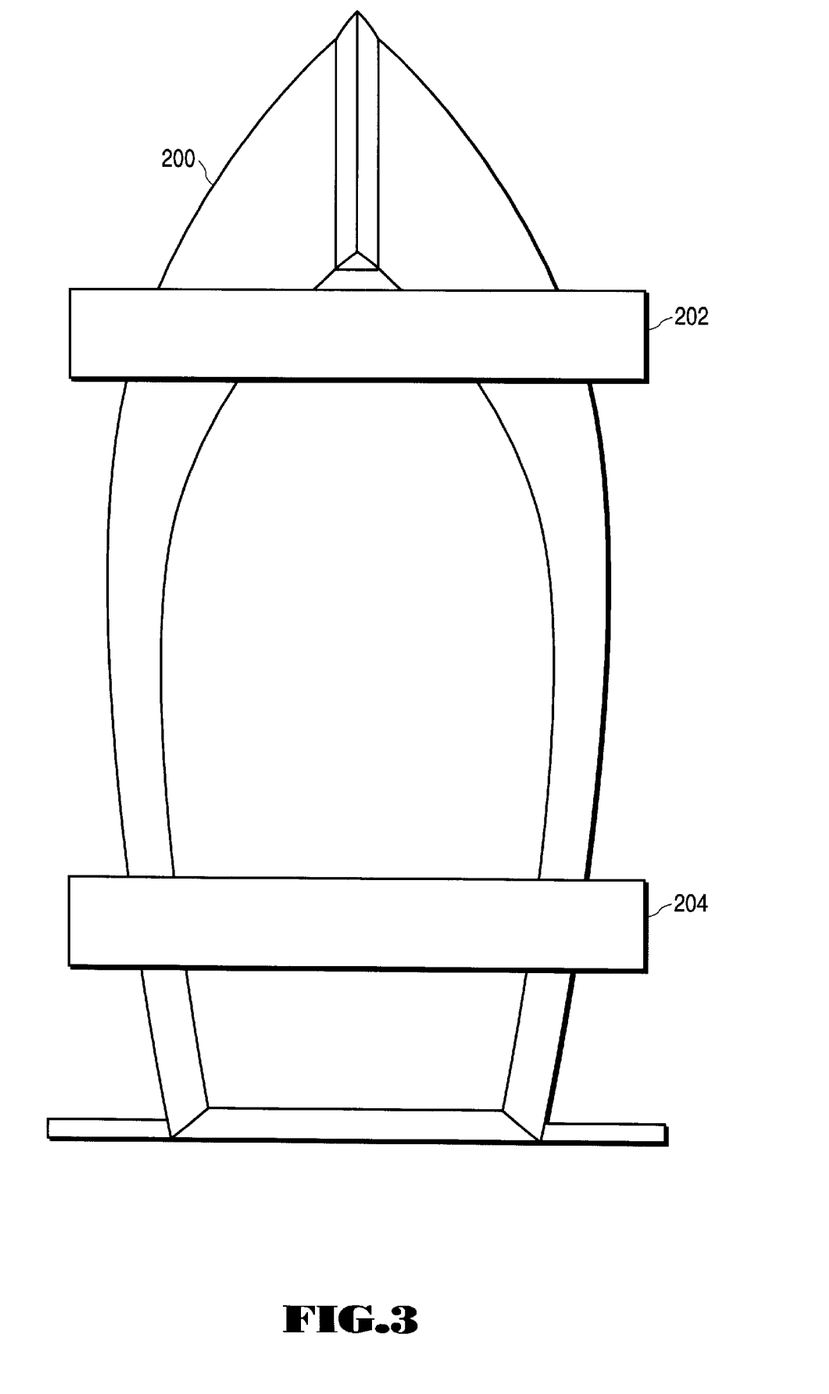
FIG. 3 is a bottom view of the sushi boat illustrated in FIG. 2.

FIG. 2A illustrates a sushi boat with a horizontal stabilizing system, according to one embodiment of the present invention. In FIG. 2A, a side view of a sushi boat 200 is illustrated. Two horizontal bars 202 and 204 are affixed to the underside of the boat, such that when the boat is placed in the waterway, the horizontal bars are submerged. The bars 202 and 204 protrude from the side of the boat, as shown in FIG. 3, which is a bottom view of the boat illustrated in FIG. 2. The horizontal bars 202 and 204 serve to counteract rolling forces on the boat 200 that may be induced from turbulent water in the waterway, and thereby provide stability from side-to-side rolling motions of the boat.

In one embodiment of the present invention, the horizontal bars are placed at an even spacing from the bow and stern of the boat approximately midway between the midpoint of the boat and the bow or stern of the boat. For a boat that is approximately 12 inches long, each bar is approximately one inch wide is used. The length of the bars depends upon the width of the waterway 106 in which the boat is placed. The horizontal bars 202 can be affixed to the underside of boat 200 through a waterproof adhesive, screws, tack nails, or similar fixing means. In one embodiment, the bars 202 are made of a clear plastic material approximately one-eighth to one-quarter of an inch thick. The use of clear plastic helps to hide the stabilizer bars as the boat floats along the waterway. The length of each bar is selected such that the boat fits within the waterway without the ends of the bars contacting the sides of the waterway.

In an alternative embodiment of the present invention, a single horizontal bar can be positioned in the middle of the underside of the boat. For this embodiment, the bar may be wider than the bars used in the two-bar configuration of FIG. 3. Similarly, in a further alternative embodiment, three or more narrow bars can be arranged along the underside of the boat. It should be noted that the specific size and shape of the horizontal bar illustrated in FIG. 3 can be altered depending upon the dimensions of the boat and the waterway channel. Moreover, various types of materials, such as plastic or wood can be used to construct the stabilizer bars.

Figure 4A:
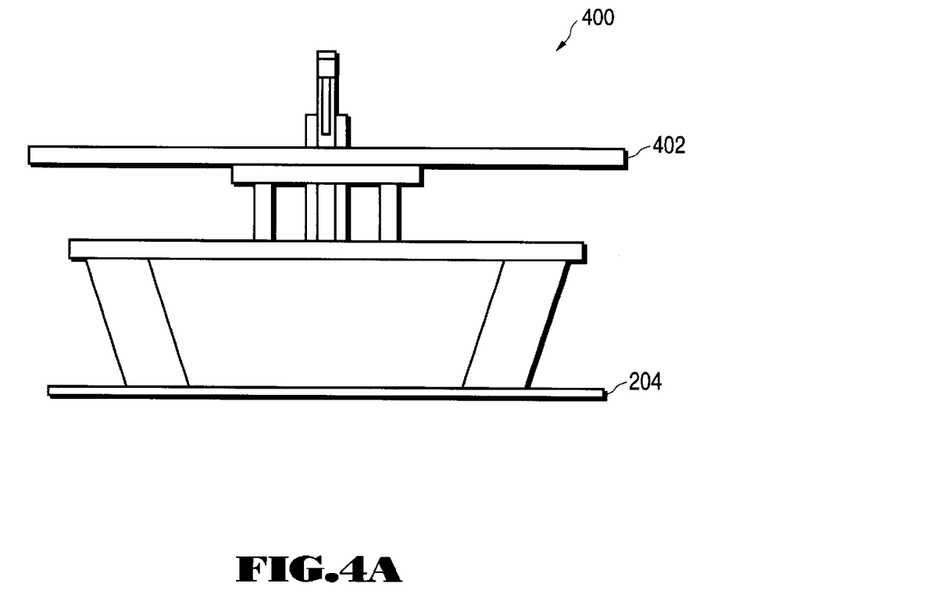
FIG. 4A is a back view of the sushi boat illustrated in FIG. 2 with the addition of an elongated stern bar fixed to the stern of the boat.
Figure 4B:
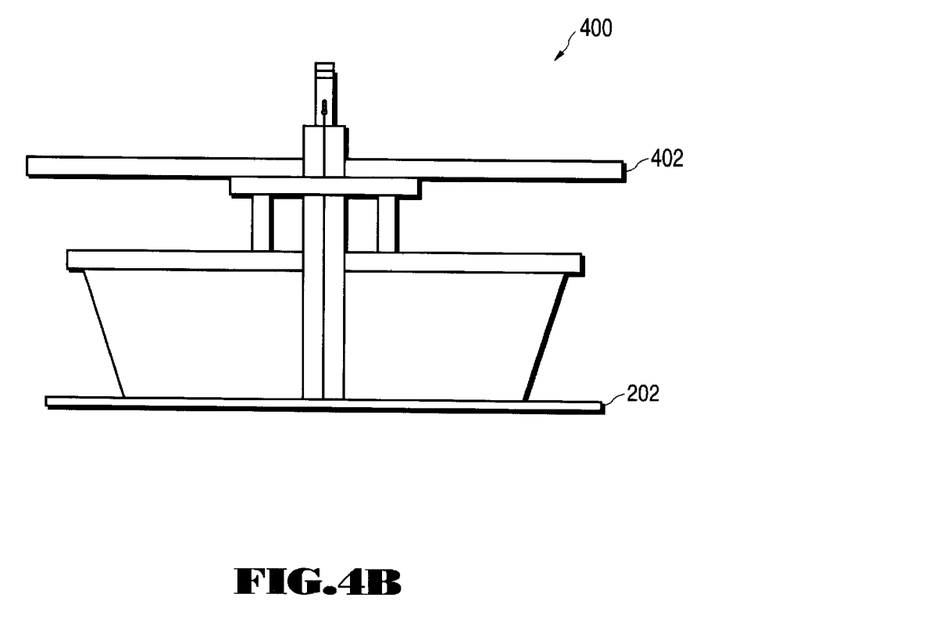
FIG. 4B is a frontal view of the sushi boat illustrated in FIG. 4A.

In one embodiment of the present invention, the boats within the continuous waterway are decoupled from one another and are independently removable from the waterway. Once in the waterway, the boats are free to bump up against one another. For this embodiment, the stern section of each boat includes an elongated stern bar that extends beyond the width of the boat. FIG. 4A is a back view of a sushi boat that illustrates a stern bar 402 fixed to the stern of the boat. The stern bar 402 provides a surface against which the bow of the boat behind can push against. As illustrated in FIG. 4, the width of the stern bar 402 is selected to be slightly wider than the maximum width of the boat. This prevents the bow of the boat behind from entangling with any other structure on the boat in front. As shown in FIG. 2, the bow of the boat rises high enough above the top surface of the boat to contact the stern bar of the boat in front. In the manner, boats deployed in the waterway can "push" each other along if they get to close to one another.

Figure 5A:
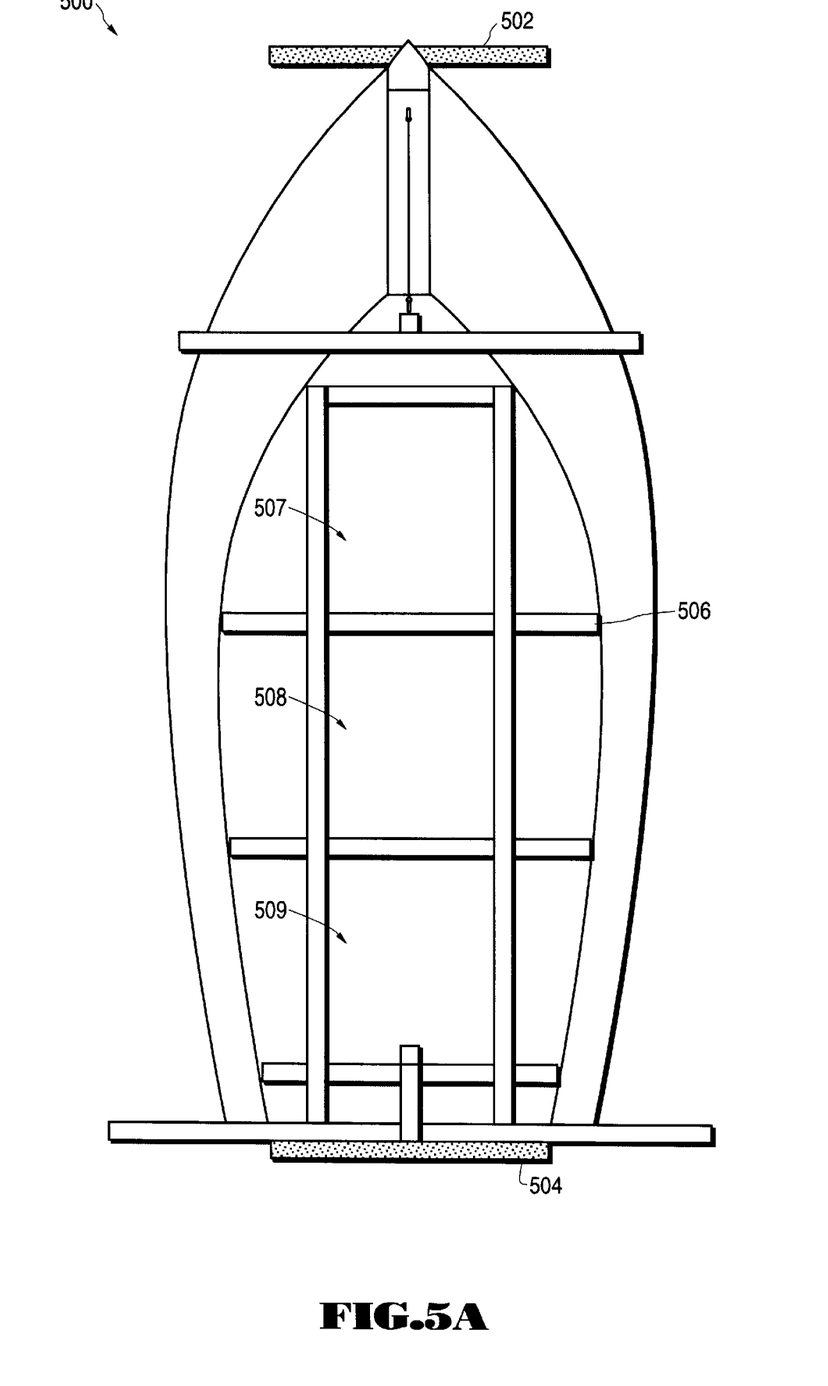
FIG. 5A is a top view of a boat illustrating the placement of magnets on the bow and stern of the boat.
Figure 5B:
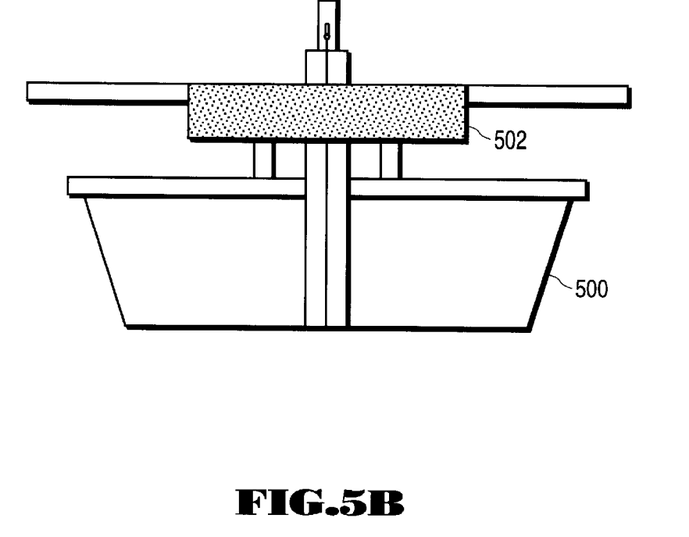
FIG. 5B is a front view of the boat in FIG. 5A illustrating the position of the bar magnet on the bow of the boat.
Figure 5C:
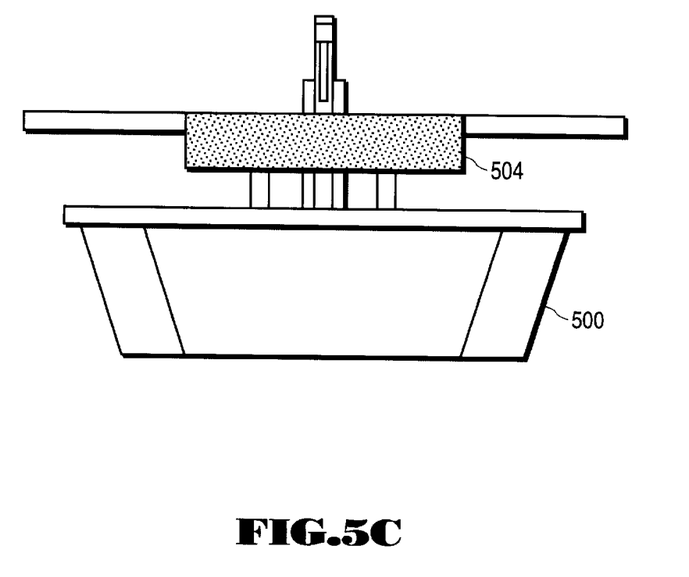
FIG. 5C is a back view of the boat in FIG. 5A, illustrating the position of the bar magnet on the stern of boat.

In an alternative embodiment of the present invention, the boats in waterway 106 are maintained at a predetermined distance from one another through the use of magnets affixed to the bow and stern of each boat. Magnets of opposite poles are selected for the bow of the following boat and the stern of the preceding boat so that the repulsive force of the magnets keeps the boats at a distance from one another. FIG. 5A is a top view of a boat illustrating the placement of magnets on the bow and stern of the boat. Boat 500 includes a bar magnet 502 affixed to the bow of the boat, and a second bar magnet 504 affixed to the stern of the boat. FIG. 5B is a front view of the boat in FIG. 5A illustrating the position of the bar magnet 502 on the bow of boat 500; likewise, FIG. 5C is a back view of the boat in FIG. 5A, illustrating the position of the bar magnet 506 on the stern of boat 500. To attain the proper effect, the position of the magnets 502 and 506 must be consistent among all of the boats so that the position of the stern magnet lines up with the position of the bow magnet for each pair of boats. In this manner, the maximum effect of the magnetic force can be experienced for each pair of boats.

Figure 6:
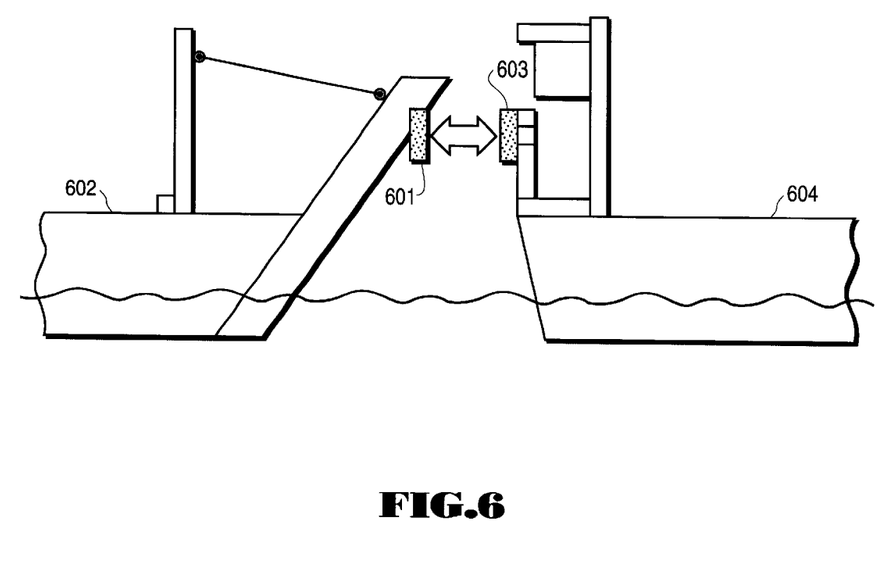
FIG. 6 illustrates the effect of the magnets in maintaining a distance between pairs of boats in the waterway.

FIG. 6 illustrates the effect of the magnets in maintaining a distance between pairs of boats in the waterway. The polarity of the bow magnet 601 on the following boat 602 is selected to be of the opposite polarity of the stern magnet 603 of the front boat 604. Through the repulsive force of two magnets 601 and 603, a distance is maintained between the two boats. This prevents the boats from colliding with one another creating excessive turbulence in the waterway. It should be noted that with respect to the embodiment illustrated in FIGS. 5A, 5B, 5C, and 6, magnets of various sizes and shapes can be used, depending upon the size and configuration of the boats and the waterway.

In one embodiment of the present invention, the boats 108 illustrated in FIG. 1 each carry a number of rectangular trays measuring approximately one and a half inches wide by three inches long. These are carried on the deck of the boats such that the narrow side of the trays lines up with the side of the boat. The sides of the boat rise slightly above the deck so that the trays are carried within each boat. For this embodiment, a tray holder is provided on the deck of each boat. The tray holder holds each tray within the boat and prevents it from sliding around on the deck of the boat and colliding with other trays on the boat. The configuration of a tray holder for a sushi boat, according to one embodiment of the present invention is illustrated in FIG. 5A. Tray holder 506 is a wooden lattice comprising four cross-members coupled together by two longitudinal members. This forms three separate compartments 507, 508, and 509. Each compartment is configured to hold in place a single tray. The size and configuration of tray holder 506 is determined by the actual dimension of the trays to be held and the shape and dimension of the deck of boat 500. It should be noted that tray holders of different sizes and capacities other than that shown in FIG. 5 can be utilized in conjunction with alternate embodiments of the present invention.

Figure 2B:
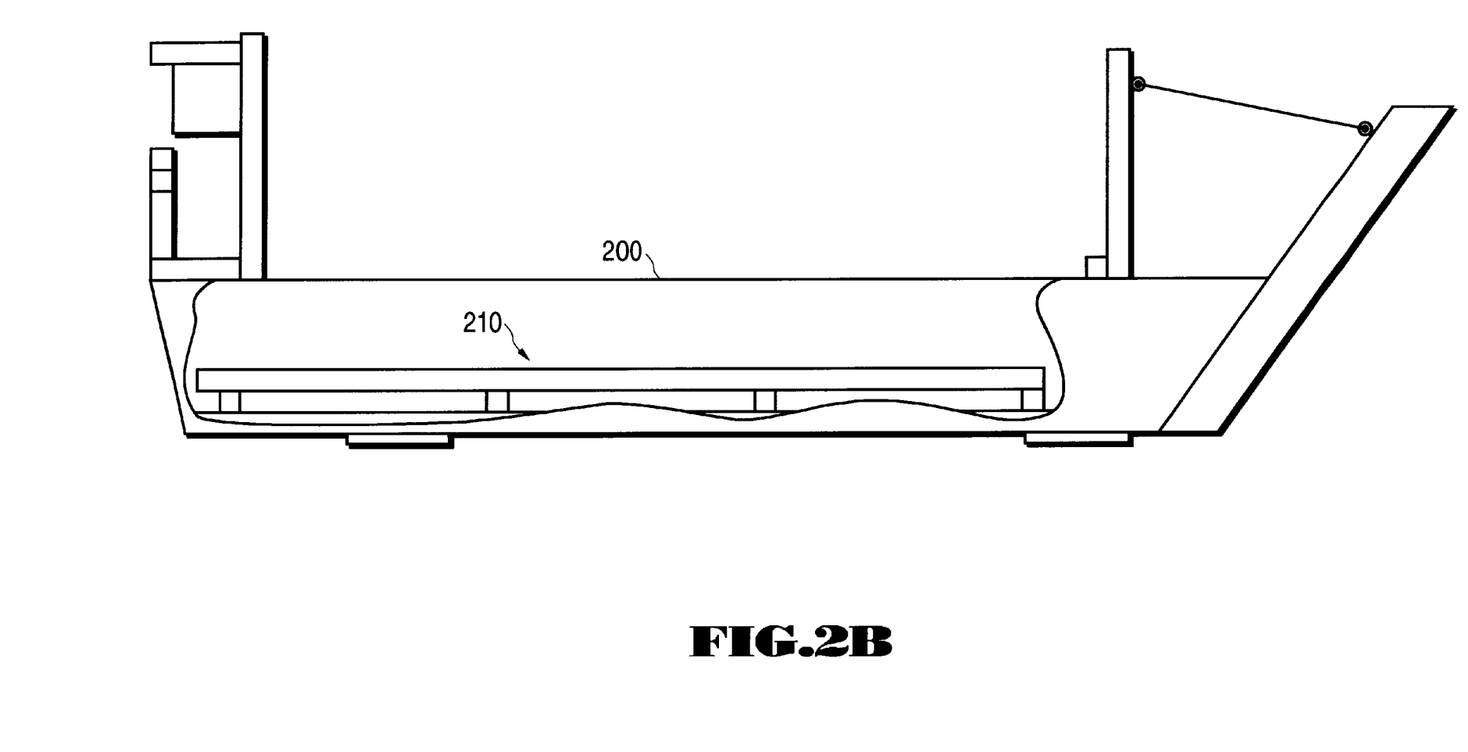
FIG. 2B illustrates a cutaway view of the sushi boat of FIG. 2B.

FIG. 2B is a cutaway view of a sushi boat that illustrates the position of the tray holder on the deck of the boat. Tray holder 210 rests on the deck of the boat, which is slightly lower than the height of the sides of the boat 200. The actual height of tray holder 210 can be altered depending upon the configuration of the boat and the size and configuration of the trays that are held on the holder.

Although the food serving system illustrated in the Figures has been described in relation to a restaurant that serves sushi, it should be noted that embodiments of the present invention can be directed to systems that serve other types of food, such as small snacks, Chinese Dim Sum, and similar types of food.

In the foregoing, a system has been described for presenting food items in a continuous waterway system utilizing floating boats. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A boat shaped food carrier for carrying food on a continuous waterway around which can be situated one or more customers, the food carrier comprising:

one or more stabilizer bars affixed to a bottom surface of the food carrier and extending from the side of the food carrier to stabilize the food carrier from a rolling motion in the water; and a horizontal bar affixed to an end of the food carrier and configured to contact a portion of a following food carrier when the food carrier and following food carrier are deployed in the continuous waterway.

2. The food carrier of claim 1 wherein the one or more stabilizer bars are composed of clear plastic.

3. The food carrier of claim 2 wherein the horizontal bar is configured to be slightly longer than the widest part of the food carrier.

4. The food carrier of claim 1 further comprising a first magnet placed on the front portion of the food carrier and a second magnet placed on the back portion of the food carrier.

5. The food carrier of claim 4 wherein the first and second magnets are positioned so as to line up with magnets affixed to the front and back portions of other food carriers when the food carrier and the other food carriers are deployed in the continuous waterway.

6. The food carrier of claim 1 wherein the food carrier is configured to a plurality of trays upon which are placed food items for selection by the customers, the food carrier further comprising a tray holder configured to arrange the plurality of trays on a top surface of the food carrier and prevent the plurality of trays from contacting one another when the food carrier is deployed in the continuous waterway.

7. The food carrier of claim 6 wherein the tray holder comprises a lattice structure including a plurality of compartments, each compartment configured to hold a single tray of the plurality of trays.

8. A system for carrying food in a continuous manner around one or more customers, the system comprising:

a continuous waterway with an induced current for propelling objects placed thereon;

a plurality of boat shaped food carriers for floating on the surface of the waterway, and configured to carry one or more trays of food on a top surface the food carrier, wherein each food carrier comprises one or more stabilizer bars affixed to a bottom surface of the food carrier.

9. The system of claim 8 wherein each food carrier further comprises a tray holder attached to a top surface of the food carrier and configured to prevent trays placed on the top surface of the food carrier from contacting one another.

10. The system of claim 8 wherein the one or more stabilizer bars comprise clear plastic bars.

11. The system of claim 8 wherein each food carrier further comprises an elongated bar attached to the stern end of the food carrier and configured to exceed the width of the food carrier.

12. The system of claim 11 wherein the bow of each food carrier is configured to contact the stern of the food carrier in front along the stern bar of the food carrier in front.

13. The system of claim 8 wherein the food carrier further comprises a first magnet attached to the bow end of the food carrier and a second magnet attached to the stern end of the food carrier.

14. The system of claim 13 wherein the polarity of the first magnet is selected to be the opposite of a magnet affixed to the stern end of a food carrier placed in front of the food carrier.

\* \* \* \* \*